(12) United States Patent
Tang

(10) Patent No.: US 11,665,582 B2
(45) Date of Patent: *May 30, 2023

(54) BUFFER STATUS REPORTING METHOD, TERMINAL, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 205 days.

This patent is subject to a terminal disclaimer.

(21) Appl. No.: 17/161,444

(22) Filed: Jan. 28, 2021

(65) Prior Publication Data
US 2021/0153072 A1 May 20, 2021

Related U.S. Application Data

(63) Continuation of application No. 16/826,136, filed on Mar. 20, 2020, now Pat. No. 10,932,154, which is a
(Continued)

(51) Int. Cl.
*H04W 4/00* (2018.01)
*H04W 28/02* (2009.01)
(Continued)

(52) U.S. Cl.
CPC ....... *H04W 28/0278* (2013.01); *H04L 1/0008* (2013.01); *H04L 1/1614* (2013.01); *H04W 28/06* (2013.01); *H04W 80/02* (2013.01)

(58) Field of Classification Search
CPC . H04W 28/0278; H04W 28/06; H04W 80/02; H04W 72/1284; H04W 8/24;
(Continued)

(56) References Cited

U.S. PATENT DOCUMENTS 8,179,921 B2 * 5/2012 Chun ................... H04W 28/06
370/528
8,792,440 B2 7/2014 Feuersänger
(Continued)

FOREIGN PATENT DOCUMENTS

CN 101932019 A 12/2010
CN 102291200 A 12/2011
(Continued)

OTHER PUBLICATIONS

First Office Action of the Chinese application No. 202010089335.0, dated Jan. 28, 2022. 16 pages with English translation.
(Continued)

*Primary Examiner* — Stephen M D Agosta
(74) *Attorney, Agent, or Firm* — Perkins Coie LLP

(57) ABSTRACT

An embodiment of the present invention discloses a buffer status reporting method, where the method including: triggering, by a terminal, reporting of a padding buffer status report (padding BSR); and determining, by the terminal, a reported BSR format according to a size of padding bits, a size of a first type of BSR format plus its media access control (MAC) subheader, and a quantity of logical channel groups currently having to-be-transmitted data being buffered, where a quantity of logical channel groups corresponding to the BSR format is greater than or equal to 1, and less than or equal to a maximum quantity of logical channel groups currently having to-be-transmitted data being buffered.

24 Claims, 8 Drawing Sheets

Related U.S. Application Data continuation of application No. PCT/CN2017/102662, filed on Sep. 21, 2017.

(51) Int. Cl.
  *H04L 1/00* (2006.01)
  *H04L 1/1607* (2023.01)
  *H04W 28/06* (2009.01)
  *H04W 80/02* (2009.01)

(58) Field of Classification Search
  CPC .......... H04W 28/0252; H04L 1/0008; H04L 1/1614; H04L 1/0079; H04B 7/15528; H04B 7/2606
  See application file for complete search history.

(56) References Cited

U.S. PATENT DOCUMENTS

| | | | |
|---|---|---|---|
| 10,342,035 B2 | 7/2019 | Lee et al. | |
| 11,234,156 B2* | 1/2022 | Tang | H04W 28/0278 |
| 11,252,753 B2* | 2/2022 | Chen | H04L 1/1896 |
| 2009/0080380 A1* | 3/2009 | Chun | H04W 28/06 370/329 |
| 2009/0219951 A1* | 9/2009 | Chun | H04W 28/06 370/474 |
| 2009/0285237 A1* | 11/2009 | Chun | H04W 28/06 370/474 |
| 2010/0074168 A1 | 3/2010 | Wu | |
| 2010/0077100 A1* | 3/2010 | Hsu | H04W 24/10 709/234 |
| 2010/0118889 A1 | 5/2010 | Chun | |
| 2010/0232385 A1* | 9/2010 | Hsu | H04W 74/02 370/329 |
| 2010/0238863 A1* | 9/2010 | Guo | H04L 5/0082 370/328 |
| 2010/0272046 A1 | 10/2010 | Guo | |
| 2010/0322086 A1 | 12/2010 | Harris | |
| 2011/0242972 A1* | 10/2011 | Sebire | H04L 67/06 370/229 |
| 2011/0274044 A1* | 11/2011 | Park | H04L 47/10 370/328 |
| 2012/0069805 A1* | 3/2012 | Feuersanger | H04W 28/0278 370/329 |
| 2012/0093121 A1* | 4/2012 | Zhang | H04W 72/1284 370/329 |
| 2012/0099452 A1* | 4/2012 | Dai | H04W 72/1284 370/252 |
| 2012/0250605 A1* | 10/2012 | Du | H04L 49/90 370/315 |
| 2013/0114445 A1* | 5/2013 | Wen | H04W 72/1252 370/252 |
| 2014/0269352 A1* | 9/2014 | Sun | H04W 72/1284 370/250 |
| 2014/0293896 A1* | 10/2014 | Kuo | H04L 5/0053 370/329 |
| 2015/0003371 A1* | 1/2015 | Park | H04W 28/0278 370/329 |
| 2015/0043352 A1* | 2/2015 | Jang | H04W 72/1284 370/241 |
| 2016/0029245 A1* | 1/2016 | Hong | H04W 28/0278 370/329 |
| 2016/0044678 A1* | 2/2016 | Kwon | H04W 72/0453 370/329 |
| 2016/0044737 A1* | 2/2016 | Kwon | H04W 76/14 370/328 |
| 2016/0081108 A1* | 3/2016 | Tseng | H04W 72/1242 370/329 |
| 2016/0088624 A1* | 3/2016 | Lee | H04W 72/1242 370/329 |
| 2016/0381595 A1* | 12/2016 | Lee | H04W 72/0406 370/329 |
| 2017/0019812 A1* | 1/2017 | Lee | H04W 28/0278 |
| 2017/0019893 A1 | 1/2017 | Zhao et al. | |
| 2017/0127315 A1* | 5/2017 | Chen | H04W 76/15 |
| 2017/0150512 A1 | 5/2017 | Cao | |
| 2018/0270698 A1* | 9/2018 | Babaei | H04W 24/08 |
| 2018/0270699 A1* | 9/2018 | Babaei | H04W 28/0278 |
| 2018/0270700 A1* | 9/2018 | Babaei | H04W 72/042 |

FOREIGN PATENT DOCUMENTS

| | | |
|---|---|---|
| CN | 103037438 A | 4/2013 |
| CN | 103037438 B | 7/2016 |
| EP | 2094038 A1 | 8/2009 |
| EP | 3145240 A | 3/2017 |
| EP | 3145240 A1 | 3/2017 |
| RU | 2522183 C2 | 7/2014 |
| TW | 201703489 A | 1/2017 |

OTHER PUBLICATIONS

First Office Action of the Korean application No. 10-2020-7011553, dated Mar. 18, 2022. 10 pages with English translation.
Second Office Action of the Canadian application No. 3076147, dated Feb. 21, 2022. 5 pages.
Written Opinion of the International Search Authority in the international application No. PCT/CN2017/102662, dated May 30, 2018.
First Office Action of the European application No. 17925968.4, dated Apr. 19, 2021.
First Office Action of the Canadian application No. 3076147, dated May 14, 2021.
First Office Action of the Japanese application No. 2020-516574, dated Sep. 3, 2021. 8 pages with English translation.
Second Office Action of the European application No. 17925968.4, dated Oct. 25, 2021. 8 pages.
First Office Action of the Taiwanese application No. 107133128, dated Oct. 29, 2021. 15 pages with English translation.
Office Action of the Indian application No. 202017016970, dated Nov. 3, 2021. 6 pages with English translation.
Decision of Re-examination of the Taiwanese application No. 107133128, dated Jun. 6, 2022. 8 pages with English Translation.
Decision of Refusal of the Japanese application No. 2020-516574, dated May 6, 2022. 7 pages with English Translation.
Oral Proceedings of the European application No. 17925968.4, issued on May 16, 2022. 11 pages.
Second Office Action of the Chinese application No. 202010089335.0, dated Jun. 27, 2022. 12 pages with English Translation.
Ericsson; "BSR formats in NR", 3GPP TSG-RAN WG2 #99, Tdoc R2-1708349, Berlin, Germany, Aug. 21-25, 2017.
Samsung. "Truncated BSR Operation", 3GPP TSG-RAN WG2#99 Meeting R2-1709239, Aug. 25, 2017 (Aug. 25, 2017), section 2.
International Search Report in the international application No. PCT/CN2017/102662, dated May 30, 2018.
Catt: "BSR MAC CE Format", 3GPP Draft; R2-1707920, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), XP051317855, Retrieved from the Internet: URL: http://www.3gpp.org/ftp/Meetings_3GPP_SYNC/RAN2/Docs/ [retrieved on Aug. 20, 2017] *p. 2-p. 3*.
LG Electronics Inc: "BSR format with increased LCG", 3GPP Draft; R2-1709149 BSR Format With Increased LCG, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), XP051318938, Retrieved from the Internet: URL: http://www.3gpp.org/ftp/Meetings_3GPP_SYNC/RAN2/Docs/ [retrieved on Aug. 20, 2017] * figures 3,4 *.
Supplementary European Search Report in the European application No. 17925968.4, dated Jul. 21, 2020.
First Office Action of the Russian application No. 2020114248, dated Nov. 30, 2020.
Non-Final Office Action of the U.S. Appl. No. 16/826,136, dated Jun. 29, 2020.

(56) References Cited

OTHER PUBLICATIONS

Notice of Allowance of the U.S. Appl. No. 16/826,136, dated Oct. 8, 2020.
Corrected Notice of Allowability of the U.S. Appl. No. 16/826,136, dated Jan. 13, 2021.

* cited by examiner

| R | R | LCID | | Oct 1 |

| B1 | B2 | B3 | B4 | B5 | B6 | B7 | B8 | Oct 1 |
| BS #0 | | | | | | BS #1 | | Oct 2 |
| BS #1 | | | BS #2 | | | | | Oct 3 |
| BS #2 | | BS #3 | | | | | | Oct 4 |
| BS #4 | | | | | BS #5 | | | Oct 5 |
| BS #5 | | | BS #6 | | | | | Oct 6 |
| BS #6 | | BS #7 | | | | | | Oct 7 |

FIG. 2B

BUFFER STATUS REPORTING METHOD, TERMINAL, AND COMPUTER STORAGE MEDIUM

CROSS-REFERENCES TO RELATED APPLICATIONS

This application is a continuation of U.S. patent application Ser. No. 16/826,136, filed on Mar. 20, 2020 which is a continuation of and claims priority to International Patent Application PCT/CN2017/102662, filed on Sep. 21, 2017, the contents of which are hereby incorporated by reference in their entirety.

BACKGROUND OF THE INVENTION

Technical Field

The present invention relates to a wireless communications technology, and specifically, to a buffer status reporting method, a terminal, and a computer storage medium.

Related Art

A terminal informs, in a form of reporting a buffer status report (BSR), a base station of a status of to-be-transmitted data buffered in the terminal, so that the base station can allocate a radio resource to the terminal more accurately. According to different events of triggering BSRs, the BSRs may be classified into a regular BSR, a padding BSR, and a periodic BSR. According to formats of BSRs, the BSRs may be classified into a short BSR, a long BSR, and a truncated BSR. The padding BSR is carried in padding bits of a media access control protocol data unit (MAC PDU).

When a type of a BSR triggered by the terminal is the padding BSR, there is a plurality of logical channels having data being transmitted, and a length of the padding bits is greater than or equal to that of one short BSR and a media access control (MAC) subheader corresponding to the short BSR, but is insufficient to be used to send a long BSR and a MAC subheader corresponding to the long BSR, the terminal reports the BSR by using a type of the truncated BSR.

However, the truncated BSR is of a format of 1 byte, and the truncated BSR of this format can be used to report only a buffer data status corresponding to one of a plurality of logical channel groups, but cannot be used to report buffer data statuses corresponding to the plurality of logical channel groups having data being transmitted, so that the base station cannot learn the buffer data statuses corresponding to all the logical channel groups having data being transmitted, and therefore cannot accurately allocate a radio resource to the terminal either.

SUMMARY OF THE INVENTION

To resolve an existing technical problem, embodiments of the present invention provide a buffer status reporting method, a terminal, and a computer storage medium.

An embodiment of the present invention discloses a buffer status reporting method, where the method includes triggering, by a terminal, reporting of a padding buffer status report; and determining, by the terminal, a reported BSR format according to a number of padding bits, a size of a first type of BSR format plus its MAC subheader, and a quantity of logical channel groups currently having data to-be-transmitted, where a quantity of logical channel groups corresponding to the BSR format is greater than or equal to 1, and less than or equal to a maximum quantity of logical channel groups currently having data to-be-transmitted.

In an embodiment, the determining, by the terminal, a reported BSR format according to a number of padding bits, a size of a first type of BSR format plus its MAC subheader, and a quantity of logical channel groups currently having data to-be-transmitted includes determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is at least two, a reported BSR format based on a sum of a size of the second type of BSR format corresponding to the logical channel groups currently having data to-be-transmitted and the size of the MAC subheader corresponding to the second type of BSR format, and the number of the padding bits.

In an embodiment, the determining a reported BSR format based on a sum of a size of the second type of BSR format corresponding to the logical channel groups currently having data to-be-transmitted and the size of the MAC subheader corresponding to the second type of BSR format, and the number of the padding bits includes determining, if the sum of the size of the second type of BSR format corresponding to the logical channel groups currently having data to-be-transmitted and the size of the MAC subheader corresponding to the second type of BSR format is less than or equal to the number of the padding bits, to report the second type of BSR format, where a quantity of logical channel groups corresponding to the second type of BSR format is equal to a quantity of the logical channel groups currently having data to-be-transmitted.

In an embodiment, the determining a reported BSR format based on a sum of a size of the second type of BSR format corresponding to the logical channel groups currently having data to-be-transmitted and the size of the MAC subheader corresponding to the second type of BSR format, and the number of the padding bits includes determining, if the sum of the size of the second type of BSR format corresponding to the logical channel groups currently having data to-be-transmitted and the size of the MAC subheader corresponding to the second type of BSR format is greater than the number of the padding bits, to report a third type of BSR format, where a quantity of logical channel groups corresponding to the third type of BSR format is greater than 1 and less than a quantity of the logical channel groups currently having data to-be-transmitted.

In an embodiment, determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is one, to report the first type of BSR format.

In an embodiment, determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is greater than a sum of a maximum length of a second type of BSR format and a size of a MAC subheader corresponding to the second type of BSR format, to report the second type of BSR format, where a quantity of logical channel groups corresponding to the second type of BSR format is equal to a quantity of the logical channel groups currently having data to-be-transmitted.

In an embodiment, determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is equal to the size of the first type of BSR format plus its MAC subheader, and the quantity of logical channel groups currently having data to-be-transmitted is at least two, to report a fourth type of BSR format, where the fourth type of BSR format corresponds to one of the at least two logical channel groups.

In an embodiment, determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is equal to the size of the first type of BSR format plus its MAC subheader, and the quantity of logical channel groups currently having data to-be-transmitted is one, to report the first type of BSR format, where the first type of BSR format corresponds to the logical channel group.

In an embodiment, the second type of BSR format includes identifiers of all the logical channel groups currently having data to-be-transmitted and buffer status information corresponding to the logical channel groups and buffer status information of each logical channel group is sequenced in an order of identifiers corresponding to each logical channel group.

In an embodiment, the second type of BSR format includes a first bitmap, and bits in the first bitmap correspond to the logical channel groups currently having data to-be-transmitted, the second type of BSR format further includes buffer status information of each of the logical channel groups currently having data to-be-transmitted and buffer status information of each logical channel group is sequenced in a corresponding arrangement order to the first bitmap.

In an embodiment, before the determining to report a third type of BSR format, the method further includes sequencing, according to priorities, the logical channel groups currently having data to-be-transmitted and selecting, according to a priority sequencing result, some logical channel groups satisfying the padding bits from the logical channel groups currently having data to-be-transmitted.

In an embodiment, the third type of BSR includes a second bitmap, and bits in the second bitmap correspond to the some logical channel groups, the third type of BSR further includes buffer status information of each of the some logical channel groups, and buffer status information of each logical channel group of the some logical channel groups is sequenced in a corresponding arrangement order of the some logical channel groups to the second bitmap.

In an embodiment, the third type of BSR includes an identifier of each of the some logical channel groups and buffer status information corresponding to the logical channel groups and buffer status information of each logical channel group of the some logical channel groups is sequenced in an order of identifiers of the some logical channel groups.

An embodiment of the present invention further provides a terminal, where the terminal includes a triggering unit and a determining unit. The triggering unit is configured to trigger reporting of a padding buffer status report and the determining unit is configured to determine a BSR format for BSR to-be-reported according to a number of padding bits, a size of a first type of BSR format plus its MAC subheader, and a quantity of logical channel groups currently having data to-be-transmitted, where a quantity of logical channel groups corresponding to the BSR format is greater than or equal to 1, and less than or equal to a maximum quantity of logical channel groups currently having data to-be-transmitted.

In an embodiment, the determining unit is configured to determine, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is at least two, a BSR format for BSR to-be-reported based on a sum of a size of the second type of BSR format corresponding to the logical channel groups currently having data to-be-transmitted and the size of the MAC subheader corresponding to the second type of BSR format, and the number of the padding bits.

In an embodiment, the determining unit is configured to determine, if the sum of the size of the second type of BSR format corresponding to the logical channel groups currently having data to-be-transmitted and the size of the MAC subheader corresponding to the second type of BSR format is less than or equal to the number of the padding bits, to report the second type of BSR format, where a quantity of logical channel groups corresponding to the second type of BSR format is equal to a quantity of the logical channel groups currently having data to-be-transmitted.

In an embodiment, the determining unit is configured to determine, if the sum of the size of the second type of BSR format corresponding to the logical channel groups currently having data to-be-transmitted and the size of the MAC subheader corresponding to the second type of BSR format is greater than the number of the padding bits, to report a third type of BSR format, where a quantity of logical channel groups corresponding to the third type of BSR format is greater than 1 and less than a quantity of the logical channel groups currently having data to-be-transmitted.

In an embodiment, the determining unit is configured to determine, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is one, to report the first type of BSR format.

In an embodiment, the determining unit is configured to determine, when the number of the padding bits is greater than a sum of a maximum length of a second type of BSR format and a size of a MAC subheader corresponding to the second type of BSR format, to report the second type of BSR format, where a quantity of logical channel groups corresponding to the second type of BSR format is equal to a quantity of the logical channel groups currently having data to-be-transmitted.

In an embodiment, the determining unit is configured to determine, when the number of the padding bits is equal to the size of the first type of BSR format plus its MAC subheader, and the quantity of logical channel groups currently having data to-be-transmitted is at least two, to report a fourth type of BSR format, where the fourth type of BSR format corresponds to one of the at least two logical channel groups.

In an embodiment, the determining unit is configured to determine, when the number of the padding bits is equal to the size of the first type of BSR format plus its MAC subheader, and the quantity of logical channel groups currently having data to-be-transmitted is one, to report the first type of BSR format, where the first type of BSR format corresponds to the logical channel group.

In an embodiment, the second type of BSR format includes identifiers of all the logical channel groups currently having data to-be-transmitted and buffer status information corresponding to the logical channel groups; and buffer status information of each logical channel group is sequenced in an order of identifiers corresponding to each logical channel group.

In an embodiment, the second type of BSR format includes a first bitmap, and bits in the first bitmap correspond to the logical channel groups currently having data to-be-transmitted; the second type of BSR format further includes buffer status information of each of the logical channel groups currently having data to-be-transmitted; and buffer status information of each logical channel group is sequenced in a corresponding arrangement order to the first bitmap.

In an embodiment, the terminal further includes a sequencing unit, configured to sequence, according to priorities, before the determining unit determines to report the third type of BSR format, the logical channel groups currently having data to-be-transmitted; and select, according to a priority sequencing result, some logical channel groups satisfying the padding bits from the logical channel groups currently having data to-be-transmitted.

In an embodiment, the third type of BSR includes a second bitmap, and bits in the second bitmap correspond to the some logical channel groups; the third type of BSR further includes buffer status information of each of the some logical channel groups; and buffer status information of each logical channel group of the some logical channel groups is sequenced in a corresponding arrangement order of the some logical channel groups to the second bitmap.

In an embodiment, the third type of BSR includes an identifier of each of the some logical channel groups and buffer status information corresponding to the logical channel groups; and buffer status information of each logical channel group of the some logical channel groups is sequenced in an order of identifiers of the some logical channel groups.

An embodiment of the present invention further provides a computer storage medium, storing a computer instruction, where when the instruction is executed by a processor, a step of the buffer status reporting method according to the embodiments of the present invention is implemented.

An embodiment of the present invention further provides a terminal, including a memory, a processor, and a computer program stored in the memory and capable of being run on the processor, where when the processor executes the program, a step of the buffer status reporting method according to the embodiments of the present invention is implemented.

Based on the buffer status reporting method, the terminal, and the computer storage medium provided in the embodiments of the present invention, the method includes triggering, by a terminal, reporting of a padding buffer status report; and determining, by the terminal, a BSR format for BSR to-be-reported according to a number of padding bits, a size of a first type of BSR format plus its MAC subheader, and a quantity of logical channel groups currently having data to-be-transmitted, where a quantity of logical channel groups corresponding to the BSR format is greater than or equal to 1, and less than or equal to a maximum quantity of logical channel groups currently having data to-be-transmitted. Through the technical solutions according to the embodiments of the present invention, a BSR format for BSR to-be-reported may correspond to logical channel groups whose quantity is greater than or equal to 1, and is less than or equal to a maximum quantity of logical channel groups currently having data to-be-transmitted, to report, as much as possible, buffer status information of the logical channel groups currently having data to-be-transmitted, so that a base station can more learn a buffer situation of the terminal about the logical channel groups currently having data to-be-transmitted, and greatly implementing accuracy of allocating a radio resource to the terminal.

BRIEF DESCRIPTION OF THE DRAWINGS

FIG. 2A to FIG. 2C are schematic diagrams of BSR formats in a buffer status reporting method according to an embodiment of the present invention;

DETAILED DESCRIPTION OF THE INVENTION

The present invention is further described in detail below with reference to accompanying drawings and specific embodiments.

Embodiment 1

This embodiment of the present invention provides a buffer status reporting method.

Figure 1:
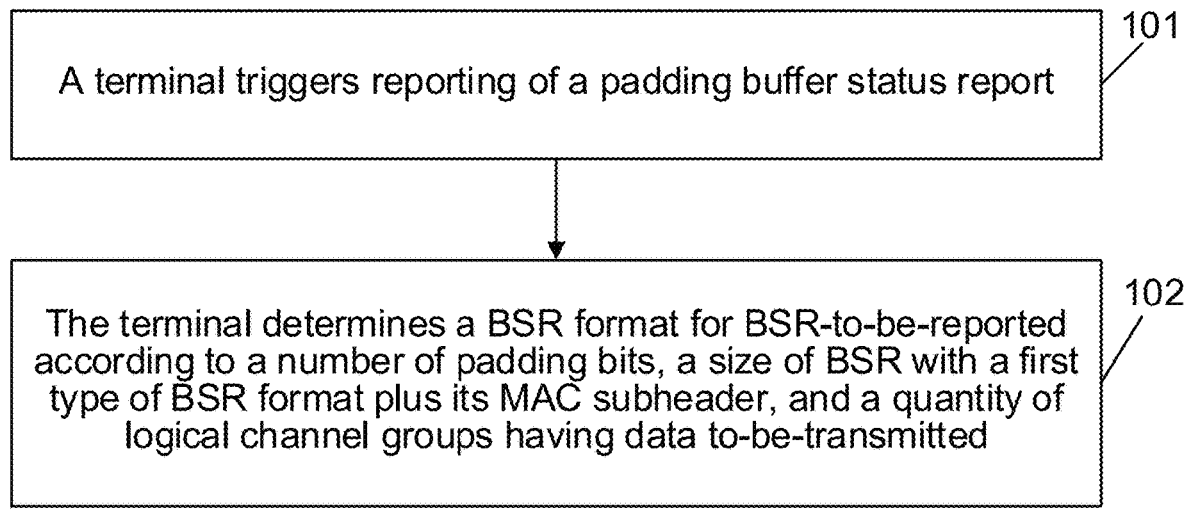
FIG. 1 is a schematic flowchart of a buffer status reporting method according to an embodiment of the present invention.

FIG. 1 is a schematic flowchart of a buffer status reporting method according to an embodiment of the present invention. As shown in FIG. 1, the method includes:

Step 101: A terminal triggers reporting of a padding buffer status report (padding BSR).

Step 102: The terminal determines a BSR format for BSR to-be-reported according to a number of padding bits, a size of a first type of BSR format plus its MAC subheader, and a quantity of logical channel groups currently having data to-be-transmitted. A quantity of logical channel groups corresponding to the BSR format is greater than or equal to 1, and is less than or equal to a maximum quantity of logical channel groups currently having data to-be-transmitted.

In this embodiment, a triggering condition of the padding BSR includes, if a length of bits used for padding in an allocated uplink resource is greater than or equal to a sum of a length of a media access control control element (MAC CE) of the BSR and a length of a corresponding MAC subheader, reporting of the padding BSR is triggered. The padding BSR is carried in padding bits of a MAC PDU, and is encapsulated as the MAC CE.

Figure 2A:
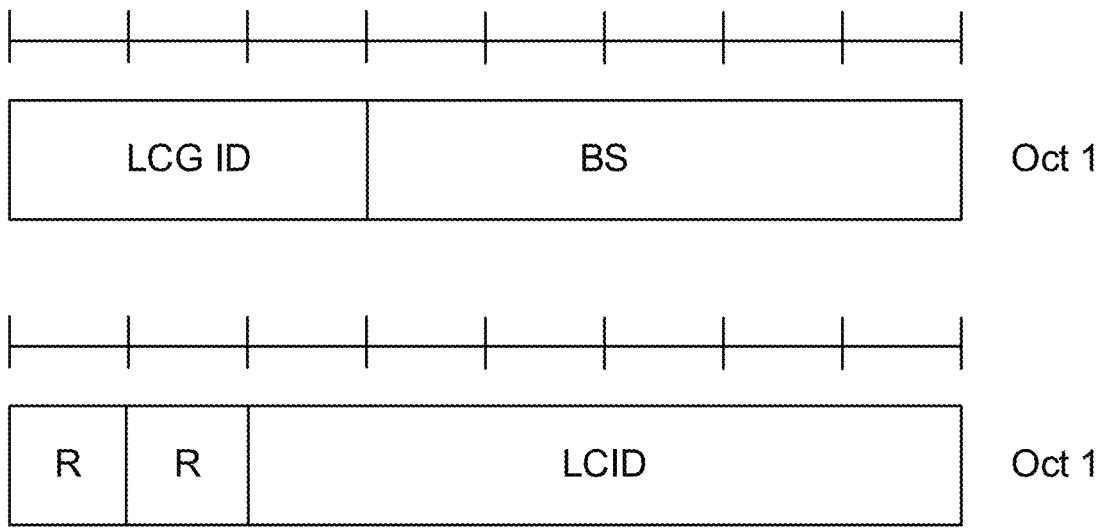
Figure 2C:
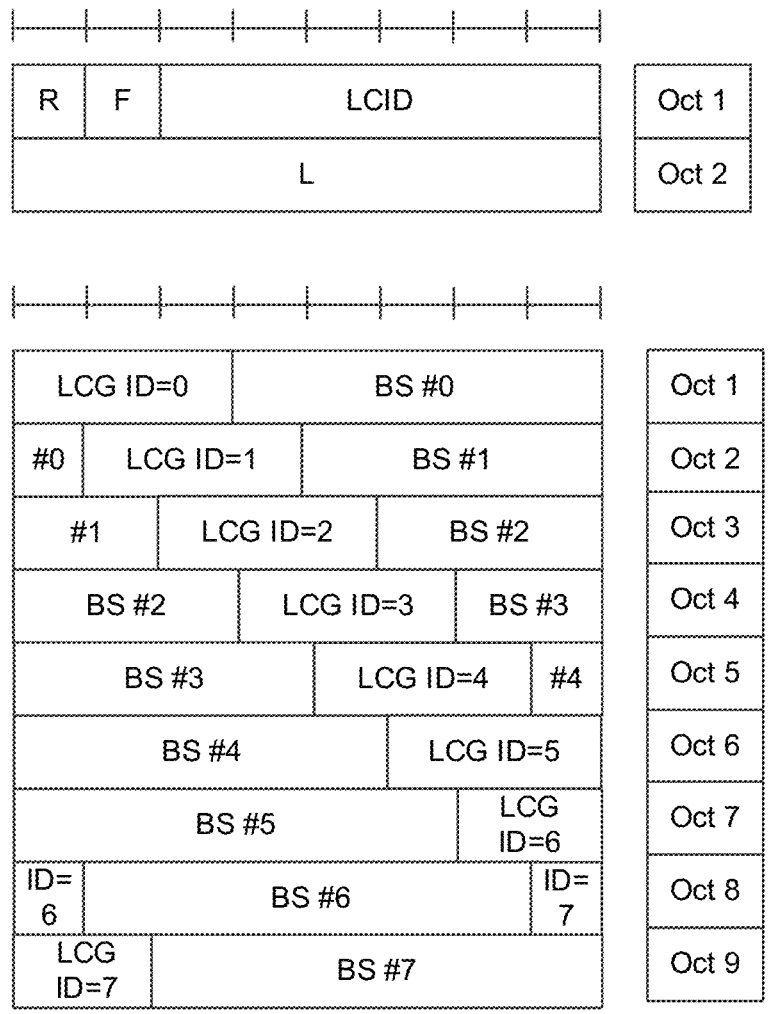

In this embodiment, the terminal determines a BSR format for BSR to-be-reported specifically according to a number of padding bits, a size of a first type of BSR format plus its MAC subheader, and a quantity of logical channel groups currently having data to-be-transmitted. The first type of BSR may specifically be a short BSR. FIG. 2A to FIG. 2C are each a schematic diagram of a BSR format in a buffer status reporting method according to an embodiment of the present invention. FIG. 2A is a schematic diagram of a short BSR format, including a 1-byte MAC subheader and a 1-byte short BSR. The MAC subheader includes a logical channel identifier (LCID), where the LCID indicates a type of a corresponding MAC CE, that is, the LCID indicates a type of a BSR format for BSR to-be-reported. The short BSR includes an identifier (LCG ID) of only one logical channel group currently having data to-be-transmitted, and a size of buffer status information of the logical channel group is represented through a buffer size (BS).

In a first implementation, the determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is at least two, a BSR format for BSR to-be-reported based on a sum of a size of the second type of BSR format corresponding to the logical channel groups currently having data to-be-transmitted and the size of the MAC subheader corresponding to the second type of BSR format, and the number of the padding bits.

Determining a BSR format for BSR to-be-reported based on a sum of a size of the second type of BSR format corresponding to the logical channel groups currently having data to-be-transmitted and the size of the MAC subheader corresponding to the second type of BSR format, and the number of the padding bits includes determining, if the sum of the size of the second type of BSR format corresponding to the logical channel groups currently having data to-be-transmitted and the size of the MAC subheader corresponding to the second type of BSR format is less than or equal to the padding bits, to report the second type of BSR format, where a quantity of logical channel groups corresponding to the second type of BSR format is equal to a quantity of the logical channel groups currently having data to-be-transmitted.

Determining a BSR format for BSR to-be-reported based on a sum of a size of the second type of BSR format corresponding to the logical channel groups currently having data to-be-transmitted and the size of the MAC subheader corresponding to the second type of BSR format, and the number of the padding bits includes determining, if the sum of the size of the second type of BSR format corresponding to the logical channel groups currently having data to-be-transmitted and the size of the MAC subheader corresponding to the second type of BSR format is greater than the number of the padding bits, to report a third type of BSR format, where a quantity of logical channel groups corresponding to the third type of BSR format is greater than 1, and is less than a quantity of the logical channel groups currently having data to-be-transmitted.

Specifically, in this implementation, the number of the padding bits is compared with the size of the first type of BSR format plus its MAC subheader, and the number of the padding bits is compared with the sum of the maximum length of the second type of BSR format and the size of the MAC subheader corresponding to the second type of BSR format. The first type of BSR format may be shown with reference to FIG. 2A, and the size of the first type of BSR format plus its MAC subheader is 2 bytes. In this embodiment, the second type of BSR is specifically a flexible long BSR, and a flexible long BSR format may be shown specifically with reference to FIG. 2B or FIG. 2C. In a 5G system, a maximum quantity of logical channel groups that may be configured to report a BSR is eight, that is, a BSR format may include buffer status information of maximally eight logical channel groups. FIG. 2B is a schematic diagram of a flexible long BSR format, including: a bitmap (the bitmap is marked as a first bitmap), where bits in the first bitmap correspond to logical channel groups currently having data to-be-transmitted; further including buffer status information of each logical channel group of the logical channel groups currently having data to-be-transmitted, where the buffer status information of each logical channel group is sequenced in a corresponding order in the first bitmap; and further including a 1-byte MAC subheader, where the MAC subheader includes an LCD, the LCID indicates a type of a corresponding MAC CE, that is, the LCID indicates a type of a BSR format for BSR to-be-reported. Specifically, a bit in the first bitmap is 1 or 0 to represent whether buffer status information of an LCG corresponding to the bit is included in the flexible long BSR. If a bit is 1, it represents that buffer status information of an LCG corresponding to the bit is included in the flexible long BSR. If a bit is 0, it represents that buffer status information of an LCG corresponding to the bit is not included in the flexible long BSR, that is, there is no buffer status information of an LCG corresponding to the bit. A size of buffer status information of a logical channel group may be 6 bits shown in FIG. 2B, but is not limited to a length of 6 bits currently, and may be further a length greater than 6 bits. Therefore, a maximum length of the flexible long BSR is changed according to the size of the buffer status information of the logical channel group. When the size of the buffer status information of the logical channel group is 6 bits shown in FIG. 2B, a sum of the maximum length of the flexible long BSR and the size of the MAC subheader corresponding to the flexible long BSR is 8 bytes.

FIG. 2C is a schematic diagram of another flexible long BSR format, including identifiers of all logical channel groups currently having data to-be-transmitted and buffer status information corresponding to the logical channel groups, where buffer status information of each logical channel group is sequenced in a corresponding order of the identifiers; and further including a 2-byte MAC subheader, where the MAC subheader includes length information of an LCD and a BSR, and length information of a flexible long BSR may be indicated through "L" in the MAC subheader. A length of an identifier of a logical channel group may be 3 bits shown in FIG. 2C. A size of buffer status information of the logical channel group may be 6 bits shown in FIG. 2C, but is not limited to a length of 6 bits currently, and may be further a length greater than 6 bits. Therefore, a maximum length of the flexible long BSR is changed according to the size of the buffer status information of the logical channel group. When the size of the buffer status information of the logical channel group is 6 bits shown in FIG. 2C, a sum of the maximum length of the flexible long BSR and the size of the MAC subheader corresponding to the flexible long BSR is 11 bytes.

Based on this, in this implementation, when a number of padding bits is greater than 2 bytes but is less than the sum of the maximum length of the flexible long BSR and the size of the MAC subheader corresponding to the flexible long BSR, and a quantity of logical channel groups currently having data to-be-transmitted is at least two, if a sum of a size of a flexible long BSR format corresponding to a logical channel group currently having data to-be-transmitted and a size of a corresponding MAC subheader is less than or equal to the number of the padding bits, it is determined to report the flexible long BSR format; or if a sum of a size of a flexible long BSR format corresponding to a logical channel group currently having data to-be-transmitted and a size of a corresponding MAC subheader is greater than the number of the padding bits, it is determined to report a third type of BSR format, where a quantity of logical channel groups corresponding to the third type of BSR format is greater than 1, and is less than a quantity of the logical channel groups currently having data to-be-transmitted.

Herein, the third type of BSR may specifically be a flexible truncated BSR. A flexible truncated BSR format may also be shown specifically with reference to FIG. 2B and FIG. 2C, and a difference lies in that a flexible truncated BSR and a flexible long BSR in a same format correspond to different LCIDs in subheaders. FIG. 2B is a schematic diagram of a flexible truncated BSR format, including: a bitmap (the bitmap is marked as a second bitmap); further including buffer status information of each logical channel group of some logical channel groups currently having buffer to-be-transmitted data, where the buffer status information of each logical channel group of the some logical channel groups is sequenced in a corresponding order of the some logical channel groups in the second bitmap; and further including a 1-byte MAC subheader, where the MAC subheader includes an LCID. The LCID indicates a type of a corresponding MAC CE, that is, the LCID indicates a type of a BSR format for BSR to-be-reported. A bit in the second bitmap is 1 or 0 to represent whether buffer status information of an LCG corresponding to the bit is included in the flexible truncated BSR. If a bit is 1, it represents that buffer status information of an LCG corresponding to the bit is included in the flexible truncated BSR. If a bit is 0, it represents that buffer status information of an LCG corresponding to the bit is not included in the flexible truncated BSR, that is, there is no buffer status information of an LCG corresponding to the bit. A size of buffer status information of a logical channel group may be 6 bits shown in FIG. 2B, but is not limited to a length of 6 bits currently, and may be further a length greater than 6 bits. Therefore, a maximum length of the flexible truncated BSR is changed according to the size of the buffer status information of the logical channel group. When the size of the buffer status information of the logical channel group is 6 bits shown in FIG. 2B, a sum of the maximum length of the flexible truncated BSR and the size of the MAC subheader corresponding to the flexible truncated BSR is 8 bytes.

FIG. 2C is a schematic diagram of another flexible truncated BSR format, including identifiers of some logical channel groups of all logical channel groups currently having data to-be-transmitted and buffer status information corresponding to the logical channel groups, where the buffer status information of the some logical channel groups is sequenced in an order of the identifiers of the some logical channel groups; and further including a 2-byte MAC subheader, the MAC subheader includes length information of an LCID and a BSR, and length information of a flexible truncated BSR may be indicated through "L" in the MAC subheader. A length of an identifier of a logical channel group may be 3 bits shown in FIG. 2C; and a size of buffer status information of the logical channel group may be 6 bits shown in FIG. 2C, but is not limited to a length of 6 bits currently, and may be further a length greater than 6 bits. Therefore, a maximum length of the flexible truncated BSR is changed according to the size of the buffer status information of the logical channel group. When the size of the buffer status information of the logical channel group is 6 bits shown in FIG. 2C, a sum of the maximum length of the flexible truncated BSR and the size of the MAC subheader corresponding to the flexible truncated BSR is 11 bytes.

Herein, before the determining to report a third type of BSR format, the method further includes sequencing, according to priorities, the logical channel groups currently having data to-be-transmitted; and selecting, according to a priority sequencing result, some logical channel groups satisfying the padding bits from the logical channel groups currently having data to-be-transmitted. A priority of a logical channel group may be specifically a priority of a logical channel in the logical channel group. In an implementation, a highest priority of a logical channel included in a logical channel group may be used as a priority of the logical channel group. During actual application, the logical channel groups currently having data to-be-transmitted are sequenced in descending order of priorities; and some logical channel groups of the logical channel groups currently having data to-be-transmitted are selected in descending order based on the number of the padding bits, because the number of the padding bits cannot satisfy all the logical channel groups currently having data to-be-transmitted.

Based on this, although the second type of BSR format (flexible long BSR) and the third type of BSR format (flexible truncated BSR) may be a same format, the second type of BSR format includes buffer status information of all the logical channel groups currently having data to-be-transmitted, while the third type of BSR format includes buffer status information of only some logical channel groups of the logical channel groups currently having data to-be-transmitted.

In a second implementation, the determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is one, to report the first type of BSR format.

Specifically, in this implementation, when the number of the padding bits is greater than 2 bytes but is less than a sum of the maximum length of the flexible long BSR and the size of the MAC subheader corresponding to the flexible long BSR, and a quantity of logical channel groups currently having data to-be-transmitted is at least two, it is determined to report the short BSR format, that is, report, through the format shown in FIG. 2A, buffer status information of only one logical channel group currently having data to-be-transmitted, where an LCID in the MAC subheader in the reported short BSR format indicates a corresponding MAC CE type, that is, the LCID indicates a type of the BSR format for BSR to-be-reported.

In a third implementation, the determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is greater than a sum of a maximum length of a second type of BSR format and a size of a MAC subheader corresponding to the second type of BSR format, to report the second type of BSR format, where a quantity of logical channel groups corresponding to the second type of BSR format is equal to a quantity of the logical channel groups currently having data to-be-transmitted.

Specifically, in this implementation, when the number of the padding bits is greater than a sum of the maximum length of the flexible long BSR and the size of the MAC subheader corresponding to the flexible long BSR, it is determined to report the flexible long BSR format, where the flexible long BSR format includes identifiers of all the logical channel groups currently having data to-be-transmitted and buffer status information corresponding to the logical channel groups.

In a fourth implementation, the determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is equal to the size of the first type of BSR format plus its MAC subheader, and the quantity of logical channel groups currently having data to-be-transmitted is at least two, to report a fourth type of BSR format, where the fourth type of BSR format corresponds to one of the at least two logical channel groups.

Specifically, in this implementation, when the number of the padding bits is equal to the sum (that is, 2 bytes) of the size of the first type of BSR format and the size of the MAC subheader corresponding to the first type of BSR format, and a quantity of logical channel groups currently having data to-be-transmitted is at least two, it is determined to report the fourth type of BSR format, where the fourth type of BSR format may be specifically the truncated BSR format, and with reference to the format shown in FIG. 2A, the truncated BSR format may include a 1-byte MAC subheader and a 1-byte truncated BSR, where an LCID in the MAC subheader indicates a corresponding MAC CE type, that is, the LCID indicates a type of the BSR format for BSR to-be-reported; and the truncated BSR includes an identifier (LCG ID) of one logical channel group of at least two logical channel groups currently having buffer to-be-transmitted data, and a size of buffer status information of the logical channel group is represented through a buffer size.

In a fifth implementation, the determining, by the terminal, a BSR format for BSR to-be-reported according to a number of padding bits, a size of a first type of BSR format plus its MAC subheader, and a quantity of logical channel groups currently having data to-be-transmitted includes determining, when the number of the padding bits is equal to the size of the first type of BSR format plus its MAC subheader, and the quantity of logical channel groups currently having data to-be-transmitted is one, to report the first type of BSR format, where the first type of BSR format corresponds to the logical channel group.

Specifically, in this implementation, when the number of the padding bits is greater than or equal to the sum (that is, 2 bytes) of the size of the first type of BSR format and the size of the MAC subheader corresponding to the first type of BSR format, and a quantity of logical channel groups currently having data to-be-transmitted is one, it is determined to report the first type of BSR format, that is, report the short BSR format.

Figure 3:
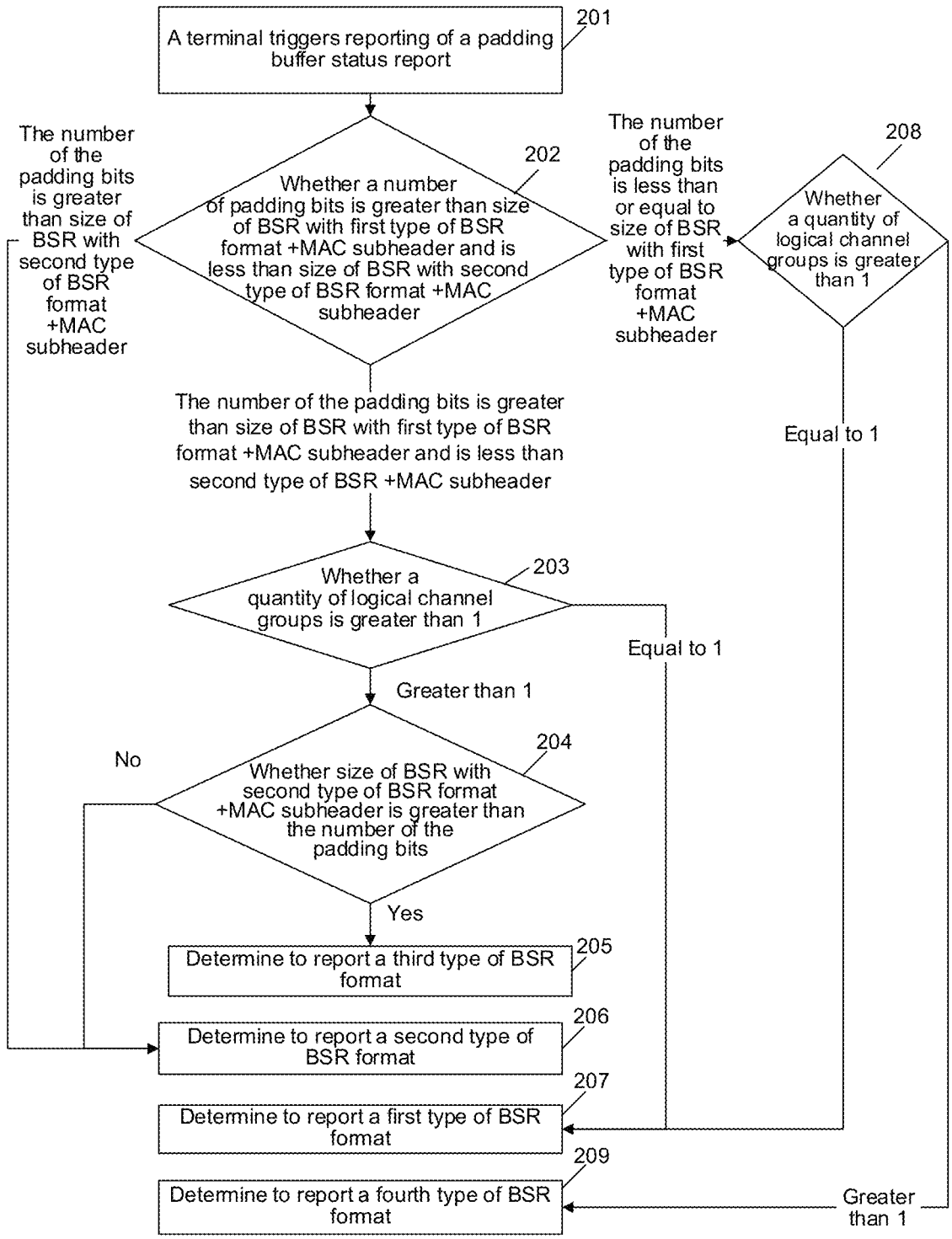
FIG. 3 is another schematic flowchart of a buffer status reporting method according to an embodiment of the present invention.

FIG. 3 is another schematic flowchart of a buffer status reporting method according to an embodiment of the present invention. As shown in FIG. 3, the buffer status reporting method according to this embodiment of the present invention is described by using an example in which a first type of BSR is a short BSR, a second type of BSR is a flexible long BSR, a third type of BSR is a flexible truncated BSR, and a fourth type of BSR is a truncated BSR. The foregoing buffer status reporting method may be implemented through the following process:

Step 201: A terminal triggers reporting of a padding BSR.

Step 202: The terminal judges whether a number of padding bits is greater than a sum of a size of a short BSR format and a size of a corresponding MAC subheader, and is less than a sum of a maximum length of a flexible long BSR format and a size of a corresponding MAC subheader. When a judgment result is that the number of the padding bits is greater than the sum of the size of the short BSR format and the size of the MAC subheader corresponding to the short BSR format, and is less than the sum of the maximum length of the flexible long BSR format and the size of the MAC subheader corresponding to the flexible long BSR format, step 203 is performed; when a judgment result is that the number of the padding bits is less than or equal to the sum of the size of the short BSR format and the size of the MAC subheader corresponding to the short BSR format, step 208 is performed; or when a judgment result is that the number of the padding bits is greater than the sum of the maximum length of the flexible long BSR format and the size of the MAC subheader corresponding to the flexible long BSR format, step 206 is performed.

Step 203: Judge whether a quantity of logical channel groups currently having data to-be-transmitted is greater than 1. When a judgment result is that the quantity of logical channel groups currently having data to-be-transmitted is greater than 1, step 204 to step 206 are performed; or when a judgment result is that the quantity of logical channel groups currently having data to-be-transmitted is equal to 1, step 207 is performed.

Step 204: Judge whether a size of the flexible long BSR format corresponding to the logical channel groups currently having data to-be-transmitted and the size of the MAC subheader corresponding to the flexible long BSR format is greater than the number of the padding bits. When a judgment result is that the sum of the size of the flexible long BSR format corresponding to the logical channel groups currently having data to-be-transmitted and the size of the MAC subheader corresponding to the flexible long BSR format is greater than the number of the padding bits, step 205 is performed; or when a judgment result is that the sum of the size of the flexible long BSR format corresponding to the logical channel groups currently having data to-be-transmitted and the size of the MAC subheader corresponding to the flexible long BSR format is less than or equal to the number of the padding bits, step 206 is performed.

Step 205: Determine to report the flexible truncated BSR format.

Step 206: Determine to report the flexible long BSR format.

Step 207: Determine to report the short BSR format.

Step 208: Judge whether a quantity of logical channel groups currently having data to-be-transmitted is greater than 1. When a judgment result is that the quantity of logical channel groups currently having data to-be-transmitted is greater than 1, step 209 is performed; or when a judgment result is that the quantity of logical channel groups currently having data to-be-transmitted is equal to 1, step 207 is performed.

Step 209: Determine to report the truncated BSR format.

Through the technical solution according to this embodiment of the present invention, a BSR format for BSR to-be-reported may correspond to logical channel groups whose quantity is greater than or equal to 1, and is less than or equal to a maximum quantity of logical channel groups currently having data to-be-transmitted, to report, as much as possible, buffer status information of the logical channel groups currently having data to-be-transmitted, so that a base station can more learn a buffer situation of the terminal about the logical channel groups currently having data to-be-transmitted, and greatly implementing accuracy of allocating a radio resource to the terminal.

Embodiment 2

Figure 4:
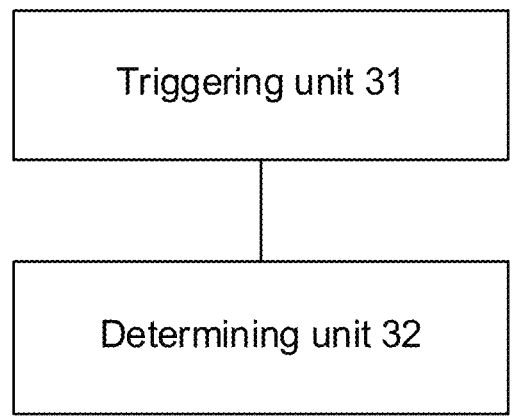
FIG. 4 is a schematic composition diagram of a terminal according to an embodiment of the present invention.

This embodiment of the present invention further provides a terminal. FIG. 4 is a schematic composition diagram of a terminal according to an embodiment of the present invention. As shown in FIG. 4, the terminal includes a triggering unit 31 and a determining unit 32.

The triggering unit 31 is configured to trigger reporting of a padding buffer status report.

The determining unit 32 is configured to determine a BSR format for BSR to-be-reported according to a number of padding bits, a size of a first type of BSR format plus its MAC subheader, and a quantity of logical channel groups currently having data to-be-transmitted, where a quantity of logical channel groups corresponding to the BSR format is greater than or equal to 1, and less than or equal to a maximum quantity of logical channel groups currently having data to-be-transmitted.

In a first implementation, the determining unit 32 is configured to determine, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is at least two, a BSR format for BSR to-be-reported based on a sum of a size of the second type of BSR format corresponding to the logical channel groups currently having data to-be-transmitted and the size of the MAC subheader corresponding to the second type of BSR format, and the number of the padding bits.

The determining unit 32 is configured to determine, if the sum of the size of the second type of BSR format corresponding to the logical channel groups currently having data to-be-transmitted and the size of the MAC subheader corresponding to the second type of BSR format is less than or equal to the number of the padding bits, to report the second type of BSR format, where a quantity of logical channel groups corresponding to the second type of BSR format is equal to a quantity of the logical channel groups currently having data to-be-transmitted.

The determining unit 32 is configured to determine, if the sum of the size of the second type of BSR format corresponding to the logical channel groups currently having data to-be-transmitted and the size of the MAC subheader corresponding to the second type of BSR format is greater than the number of the padding bits, to report a third type of BSR format, where a quantity of logical channel groups corresponding to the third type of BSR format is greater than 1 and less than a quantity of the logical channel groups currently having data to-be-transmitted.

In a second implementation, the determining unit 32 is configured to determine, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is one, to report the first type of BSR format.

In a third implementation, the determining unit 32 is configured to determine, when the number of the padding bits is greater than a sum of a maximum length of a second type of BSR format and a size of a MAC subheader corresponding to the second type of BSR format, to report the second type of BSR format, where a quantity of logical channel groups corresponding to the second type of BSR format is equal to a quantity of the logical channel groups currently having data to-be-transmitted.

In a fourth implementation, the determining unit 32 is configured to determine, when the number of the padding bits is equal to the size of the first type of BSR format plus its MAC subheader, and the quantity of logical channel groups currently having data to-be-transmitted is at least two, to report a fourth type of BSR format, where the fourth type of BSR format corresponds to one of the at least two logical channel groups.

In a fifth implementation, the determining unit 32 is configured to determine, when the number of the padding bits is equal to the size of the first type of BSR format plus its MAC subheader, and the quantity of logical channel groups currently having data to-be-transmitted is one, to report the first type of BSR format, where the first type of BSR format corresponds to the logical channel group.

In this embodiment, in an implementation, the second type of BSR format includes identifiers of all the logical channels currently having data to-be-transmitted and buffer status information corresponding to the logical channel groups; and buffer status information of each logical channel group is sequenced in an order of identifiers corresponding to each logical channel group.

In another implementation, the second type of BSR format includes a first bitmap, and bits in the first bitmap correspond to the logical channel groups currently having data to-be-transmitted; the second type of BSR format further includes buffer status information of each of the logical channel groups currently having data to-be-transmitted; and buffer status information of each logical channel group is sequenced in a corresponding arrangement order to the first bitmap.

Figure 5:
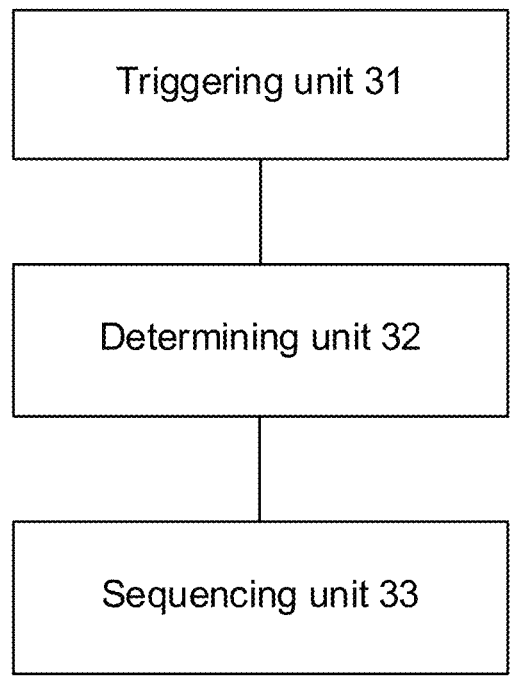
FIG. 5 is another schematic composition diagram of a terminal according to an embodiment of the present invention.

FIG. 5 is another schematic composition diagram of a terminal according to an embodiment of the present invention. As shown in FIG. 5, the terminal further includes a sequencing unit 33, configured to sequence, according to priorities, before the determining unit 32 determines to report the third type of BSR format, the logical channel groups currently having data to-be-transmitted; and select, according to a priority sequencing result, some logical channel groups satisfying the padding bits from the logical channel groups currently having data to-be-transmitted.

In this embodiment, in an implementation, the third type of BSR includes a second bitmap, and bits in the second bitmap correspond to the some logical channel groups; the third type of BSR further includes buffer status information of each of the some logical channel groups; and buffer status information of each logical channel group of the some logical channel groups is sequenced in a corresponding arrangement order of the some logical channel groups to the second bitmap.

In another implementation, the third type of BSR includes an identifier of each of the some logical channel groups and buffer status information corresponding to the logical channel groups; and buffer status information of each logical channel group of the some logical channel groups is sequenced in an order of identifiers of the some logical channel groups.

In this embodiment of the present invention, the triggering unit 31, the determining unit 32, and the sequencing unit 33 in the terminal may be implemented by a central processing unit (CPU), a digital signal processor (DSP), a microcontroller unit (MCU), or a field-programmable gate array (FPGA) during actual application.

It should be noted that when the terminal provided in the foregoing embodiment performs information processing, description is made only through examples of division of the program modules. In an actual application, the foregoing processing may be assigned according to needs to be implemented by different program modules, that is, the internal structure of the terminal is divided into different program modules, so as to implement all or a part of the processing described above. Furthermore, the terminal embodiment provided in the foregoing embodiments belongs to the same idea as the buffer status reporting method embodiment, and the method embodiment may serve as a reference for details of a specific implementation process thereof, which are not repeated herein.

Embodiment 3

Figure 6:
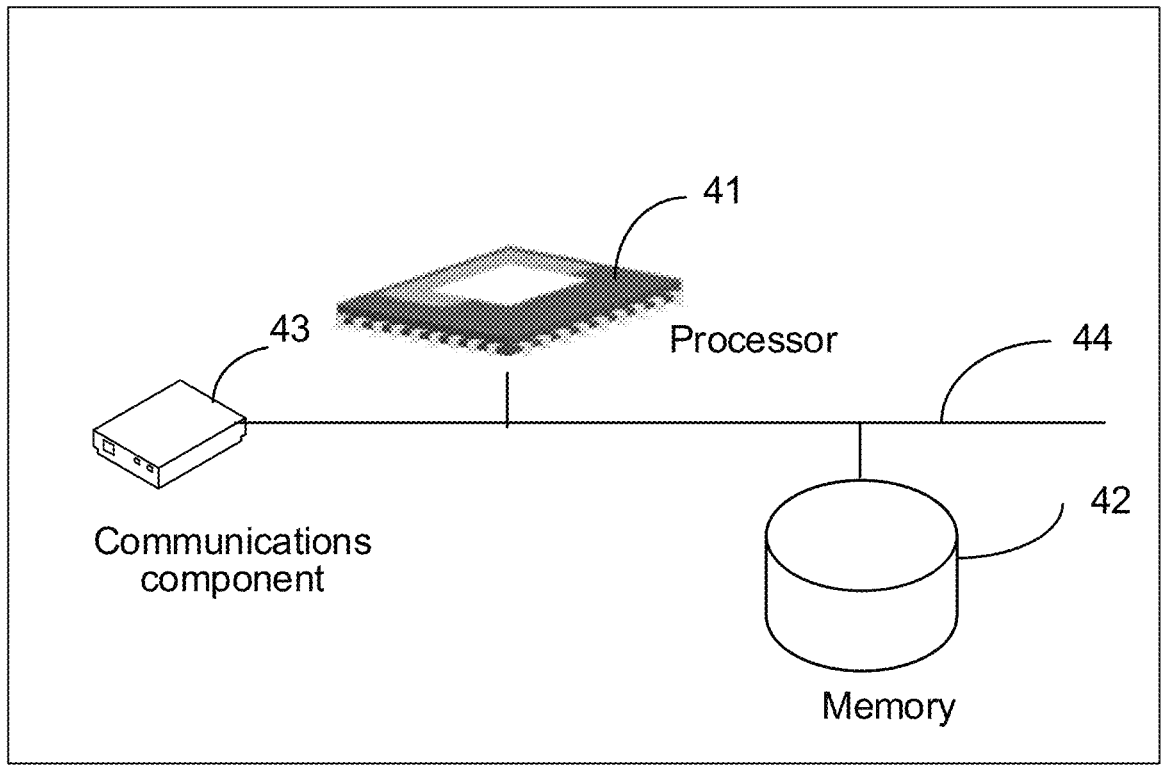
FIG. 6 is a schematic composition diagram of hardware of a terminal according to an embodiment of the present invention.

This embodiment of the present invention further provides a terminal. FIG. 6 is a schematic composition diagram of hardware of a terminal according to an embodiment of the present invention. As shown in FIG. 6, the terminal includes at least one processor 41 and a memory 42 configured to store a computer program capable of being run on the processor 41, and the terminal may further include a communications component 43. Components in the terminal are coupled together through a bus system 44. It can be understood that, the bus system 44 is configured to implement connection and communication between these components; and in addition to a data bus, the bus system 44 further includes a power bus, a control bus, and a status signal bus. However, for the sake of clear description, various buses are all marked as the bus system 44 in FIG. 6.

It can be understood that, the memory 42 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM). The magnetic surface memory may be a magnetic disk memory or a magnetic tape memory. The volatile memory may be a random access memory (RAM), and is used as an external cache. By way of example, and not limitation, many forms of RAMs are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a SyncLink dynamic random access memory (SLDRAM), and a direct Rambus random access memory (DRRAIVI). The memory 42 described in this embodiment of the present invention aims to include but not limited to these memories and any other suitable types of memories.

The method disclosed in the foregoing embodiment of the present invention may be applied to the processor 41 or implemented by the processor 41. The processor 41 may be an integrated circuit chip, and has a signal processing capability. During implementation, the steps of the foregoing method may be implemented by using a hardware integrated logic circuit in the processor 41 or implemented by using an instruction in a software form. The processor 41 may be a general purpose processor, a DSP, another programmable logic device, a discrete gate or a transistor logic device, a discrete hardware component, or the like. The processor 41 may implement or perform methods, steps, and logical block diagrams disclosed in the embodiments of the present invention. The general purpose processor may be a microprocessor, any conventional processor, or the like. Steps of the methods disclosed with reference to the embodiments of the present invention may be directly executed and completed by means of a hardware decoding processor, or may be executed and completed by using a combination of hardware and software modules in the decoding processor. The software module may be located in a storage medium, the storage medium is located in the memory 42, and the processor 41 reads information in the memory 42, and completes steps of the foregoing method in combination with hardware of the processor.

In an example of an embodiment, the terminal may be implemented by one or more application-specific integrated circuits (ASIC), DSPs, programmable logic devices (PLD), complex programmable logic devices (CPLD), FPGAs, general purpose processors, controllers, MCUs, microprocessors, or other electronic elements, to perform the foregoing method.

In this embodiment, when executing the program, the processor 41 implements triggering reporting of a padding buffer status report; and determining, by the terminal, a BSR format for BSR to-be-reported according to a number of padding bits, a size of a first type of BSR format plus its MAC subheader, and a quantity of logical channel groups currently having data to-be-transmitted, where a quantity of logical channel groups corresponding to the BSR format is greater than or equal to 1, and less than or equal to a maximum quantity of logical channel groups currently having data to-be-transmitted.

In an implementation, when executing the program, the processor 41 implements determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is at least two, a BSR format for BSR to-be-reported based on a sum of a size of the second type of BSR format corresponding to the logical channel groups currently having data to-be-transmitted and the size of the MAC subheader corresponding to the second type of BSR format, and the number of the padding bits.

When executing the program, the processor 41 implements determining, if the sum of the size of the second type of BSR format corresponding to the logical channel groups currently having data to-be-transmitted and the size of the MAC subheader corresponding to the second type of BSR format is less than or equal to the number of the padding bits, to report the second type of BSR format, where a quantity of logical channel groups corresponding to the second type of BSR format is equal to a quantity of the logical channel groups currently having data to-be-transmitted.

When executing the program, the processor 41 implements determining, if the sum of the size of the second type of BSR format corresponding to the logical channel groups currently having data to-be-transmitted and the size of the MAC subheader corresponding to the second type of BSR format is greater than the number of the padding bits, to report a third type of BSR format, where a quantity of logical channel groups corresponding to the third type of BSR format is greater than 1 and less than a quantity of the logical channel groups currently having data to-be-transmitted.

In an implementation, when executing the program, the processor 41 implements determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is one, to report the first type of BSR format.

In an implementation, when executing the program, the processor 41 implements determining, when the number of the padding bits is greater than a sum of a maximum length of a second type of BSR format and a size of a MAC subheader corresponding to the second type of BSR format, to report the second type of BSR format, where a quantity of logical channel groups corresponding to the second type of BSR format is equal to a quantity of the logical channel groups currently having data to-be-transmitted.

In an implementation, when executing the program, the processor 41 implements determining, when the number of the padding bits is equal to the size of the first type of BSR format plus its MAC subheader, and the quantity of logical channel groups currently having data to-be-transmitted is at least two, to report a fourth type of BSR format, where the fourth type of BSR format corresponds to one of the at least two logical channel groups.

In an implementation, when executing the program, the processor 41 implements determining, when the number of the padding bits is equal to the size of the first type of BSR format plus its MAC subheader, and the quantity of logical channel groups currently having data to-be-transmitted is one, to report the first type of BSR format, where the first type of BSR format corresponds to the logical channel group.

In an implementation, when executing the program, the processor 41 implements sequencing, according to priorities before determining to report the third type of BSR format, the logical channel groups currently having data to-be-transmitted; and selecting, according to a priority sequencing result, some logical channel groups satisfying the padding bits from the logical channel groups currently having data to-be-transmitted.

Embodiment 4

This embodiment of the present invention further provides a computer storage medium, including, for example, the memory 42 shown in FIG. 6 and storing a computer program, and the foregoing computer program may be executed by the processor 41 of the device, so as to complete the steps described in the foregoing method. The computer storage medium may be a memory such as an FRAM, a ROM, a PROM, an EPROM, an EEPROM, a flash memory, a magnetic surface memory, an optical disc, or a CD-ROM; or may be various devices including one of or any combination of the foregoing memories.

In this embodiment, the computer storage medium provided in this embodiment of the present invention stores the computer program, and when the computer program is run by the processor, the following is performed: triggering reporting of a padding buffer status report; and determining, by the terminal, a BSR format for BSR to-be-reported according to a number of padding bits, a size of a first type of BSR format plus its MAC subheader, and a quantity of logical channel groups currently having data to-be-transmitted, where a quantity of logical channel groups corresponding to the BSR format is greater than or equal to 1, and less than or equal to a maximum quantity of logical channel groups currently having data to-be-transmitted.

In an implementation, when the computer program is run by the processor, the following is performed: determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is at least two, a BSR format for BSR to-be-reported based on a sum of a size of the second type of BSR format corresponding to the logical channel groups currently having data to-be-transmitted and the size of the MAC subheader corresponding to the second type of BSR format, and the number of the padding bits.

When the computer program is run by the processor, the following is performed: determining, if the sum of the size of the second type of BSR format corresponding to the logical channel groups currently having data to-be-transmitted and the size of the MAC subheader corresponding to the second type of BSR format is less than or equal to the number of the padding bits, to report the second type of BSR format, where a quantity of logical channel groups corresponding to the second type of BSR format is equal to a quantity of the logical channel groups currently having data to-be-transmitted.

When the computer program is run by the processor, the following is performed: determining, if the sum of the size of the second type of BSR format corresponding to the logical channel groups currently having data to-be-transmitted and the size of the MAC subheader corresponding to the second type of BSR format is greater than the number of the padding bits, to report a third type of BSR format, where a quantity of logical channel groups corresponding to the third type of BSR format is greater than 1 and less than a quantity of the logical channel groups currently having data to-be-transmitted.

In an implementation, when the computer program is run by the processor, the following is performed: determining, when the number of the padding bits is greater than the size of the first type of BSR format plus its MAC subheader, and is less than a sum of a maximum length of a second type of BSR format and a size of a MAC subheader corresponding to the second type of BSR format, and the quantity of logical channel groups currently having data to-be-transmitted is one, to report the first type of BSR format.

In an implementation, when the computer program is run by the processor, the following is performed: determining, when the number of the padding bits is greater than a sum of a maximum length of a second type of BSR format and a size of a MAC subheader corresponding to the second type of BSR format, to report the second type of BSR format, where a quantity of logical channel groups corresponding to the second type of BSR format is equal to a quantity of the logical channel groups currently having data to-be-transmitted.

In an implementation, when the computer program is run by the processor, the following is performed: determining, when the number of the padding bits is equal to the size of the first type of BSR format plus its MAC subheader, and the quantity of logical channel groups currently having data to-be-transmitted is at least two, to report a fourth type of BSR format, where the fourth type of BSR format corresponds to one of the at least two logical channel groups.

In an implementation, when the computer program is run by the processor, the following is performed: determining, when the number of the padding bits is equal to the size of the first type of BSR format plus its MAC subheader, and the quantity of logical channel groups currently having data to-be-transmitted is one, to report the first type of BSR format, where the first type of BSR format corresponds to the logical channel group.

In an implementation, when the computer program is run by the processor, the following is performed: sequencing, according to priorities before determining to report the third type of BSR format, the logical channel groups currently having data to-be-transmitted; and selecting, according to a priority sequencing result, some logical channel groups satisfying the padding bits from the logical channel groups currently having data to-be-transmitted.

In the embodiments provided in this application, it should be understood that the disclosed terminal and method may be implemented in other manners. The described device embodiment is merely an example. For example, the unit division is merely logical function division and may be other division in actual implementation. For example, a plurality of units or components may be combined or integrated into another system, or some features may be ignored or not performed. In addition, coupling, direct coupling, or communication connection between the displayed or discussed components may be implemented through some interfaces. The indirect couplings or communication connections between the devices or units may be implemented in electrical, mechanical or other forms.

The foregoing units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be all integrated into one processing unit, or each of the units may exist alone, or two or more units are integrated into one unit. The integrated unit may be implemented through hardware, or may also be implemented in a form of hardware plus a software functional module.

Persons of ordinary skill in the art should understand that all or some of the steps of the method embodiment may be implemented by a program instructing relevant hardware. The program may be stored in a computer readable storage medium. When the program is executed, the steps in the foregoing method embodiment are performed. The storage medium may be any medium that is capable of storing program code, such as a removable storage device, a ROM, a RAM, a magnetic disk, or an optical disc.

Alternatively, when the foregoing integrated unit in the present invention is implemented in the form of a software functional module and sold or used as an independent product, the integrated unit may be stored in a computer-readable storage medium. Based on such understanding, the essence of the technical solution under the embodiments of the present invention or the contributions to the prior art may be embodied as a software product. The software product is stored in a storage medium, and includes several instructions that enable a computer device (a PC, a server or a network device) to perform all or some of the steps of the methods provided in the embodiments of the present invention. The storage medium may be any medium that is capable of storing program code, such as a removable storage device, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for buffer status reporting comprising:
    triggering, by a terminal, reporting of a padding buffer status report (padding BSR); and
    determining, by the terminal, a BSR format for BSR-to-be reported according to a number of padding bits, a size of BSR with a first type of BSR format plus its media access control (MAC) subheader, and a quantity of logical channel groups having data to-be-transmitted, wherein a quantity of logical channel groups corresponding to the BSR format is greater than or equal to 1;
    wherein determining, by the terminal, the BSR format for BSR-to-be reported according to the number of padding bits, the size of BSR with the first type of BSR format plus its MAC subheader, and the quantity of logical channel groups having data to-be-transmitted comprises:
        determining, according to a size of BSR with a second type of BSR format plus its MAC subheader corresponding to the logical channel groups having data to-be-transmitted, and the number of the padding bits, a BSR format for BSR-to-be-reported if the number of the padding bits is greater than the size of the first type of BSR format plus its MAC subheader, and is less than a size of a length of a second type of BSR format plus its MAC subheader, and the quantity of logical channel groups having data to-be-transmitted is no less than two;
    wherein the second type of BSR comprises identifiers of all the logical channel groups having data to-be-transmitted and buffer status information corresponding to the logical channel groups; and buffer status information of each logical channel group is sequenced in an order of identifiers corresponding to each logical channel group; and wherein the first type of BSR format is a short BSR format, and the second type of BSR format is a flexible long BSR format.

2. The method according to claim 1, wherein the quantity of logical channel groups corresponding to the BSR format is less than or equal to a quantity of logical channel groups having data to-be-transmitted.

3. The method according to claim 1, wherein determining, according to a size of BSR with a second type of BSR format plus its MAC subheader corresponding to the logical channel groups having data to-be-transmitted, and the number of the padding bits, a BSR format for BSR-to-be-reported comprises:

determining to report a BSR of a third BSR format type, if the size of BSR with a second type of BSR format plus its MAC subheader corresponding to the logical channel groups having data to-be-transmitted is greater than the number of the padding bits, wherein a quantity of logical channel groups corresponding to the third type of BSR format is greater than 1, and less than a quantity of the logical channel groups having data to-be-transmitted, and the third type of BSR format is a flexible truncated BSR format.

4. The method according to claim 1, wherein the second type of BSR comprises a first bitmap, and bits in the first bitmap correspond to the logical channel groups having data to-be-transmitted;

the second type of BSR further comprises buffer status information of each of the logical channel groups having data to-be-transmitted; and buffer status information of each logical channel group is sequenced in a corresponding arrangement order to the first bitmap.

5. The method according to claim 1, wherein determining, according to a size of BSR with a second type of BSR format plus its MAC subheader corresponding to the logical channel groups having data to-be-transmitted, and the number of the padding bits, a BSR format for BSR-to-be-reported comprises:

determining, if the the size of BSR with a second type of BSR format plus its MAC subheader corresponding to the logical channel groups having data to-be-transmitted is greater than the number of the padding bits, to report a BSR of a third BSR format type, wherein a quantity of logical channel groups corresponding to the third type of BSR format is greater than 1 and less than a quantity of the logical channel groups having data to-be-transmitted.

6. The method according to claim 5, wherein before determining to report a BSR of a third BSR format type, the method further comprises:

selecting, according to a result of priority sequencing, one or more logical channel groups satisfying the padding bits among the logical channel groups having data to-be-transmitted, wherein priority sequencing comprises sequencing the logical channel groups having data to-be-transmitted in an order of priority.

7. The method according to claim 6, wherein the third type of BSR comprises a second bitmap, and bits in the second bitmap correspond to the some logical channel groups;

the third type of BSR further comprises buffer status information of each of the some logical channels; and buffer status information of each logical channel group of the some logical channel groups is sequenced in a corresponding arrangement order of the some logical channel groups to the second bitmap.

8. The method according to claim 6, wherein the third type of BSR comprises an identifier of each of the some logical channel groups and buffer status information corresponding to the logical channel groups; and buffer status information of each logical channel group of the some logical channel groups is sequenced in an order of identifiers of the some logical channel groups.

9. The method according to claim 1, wherein determining, by the terminal, a BSR format for BSR-to-be reported according to a number of padding bits, a size of BSR with a first type of BSR format plus its media access control (MAC) subheader, and a quantity of logical channel groups having data to-be-transmitted comprises:

determining, if the number of the padding bits is greater than the size of BSR with a first type of BSR format plus its MAC subheader, and is less than a size of a length of a second type of BSR format plus its MAC subheader, and the quantity of logical channel groups having data to-be-transmitted is one, to report the first type of BSR format.

10. The method according to claim 1, wherein determining, by the terminal, a BSR format for BSR-to-be reported according to a number of padding bits, a size of BSR with a first type of BSR format plus its media access control (MAC) subheader, and a quantity of logical channel groups having data to-be-transmitted comprises:

determining, if the number of the padding bits is greater than a size of a length of a second type of BSR format plus its MAC subheader, to report the second type of BSR format, wherein a quantity of logical channel groups corresponding to the second type of BSR format is equal to a quantity of the logical channel groups having data to-be-transmitted.

11. The method according to claim 1, wherein determining, by the terminal, a BSR format for BSR-to-be reported according to a number of padding bits, a size of BSR with a first type of BSR format plus its media access control (MAC) subheader, and a quantity of logical channel groups having data to-be-transmitted comprises:

determining, if the number of the padding bits is equal to the size of BSR with a first type of BSR format plus its MAC subheader, and the quantity of logical channel groups having data to-be-transmitted is at least two, to report a fourth type of BSR format, wherein the fourth type of BSR format corresponds to one of the at least two logical channel groups.

12. The method according to claim 1, wherein determining, by the terminal, a BSR format for BSR-to-be reported according to a number of padding bits, a size of BSR with a first type of BSR format plus its media access control (MAC) subheader, and a quantity of logical channel groups having data to-be-transmitted comprises:

determining, if the number of the padding bits is equal to the size of BSR with the first type of BSR format plus its MAC subheader, and the quantity of logical channel groups having to-be-transmitted data being buffered is one, to report the first type of BSR format, wherein the first type of BSR format corresponds to the logical channel group.

13. A terminal comprising:
a memory configured to store computer-executable instructions; and one or more processors in communication with the memory and configured to execute the computer-executable instructions to at least:
  trigger reporting of a padding buffer status report; and
  determine a BSR format for BSR-to-be reported according to a number of padding bits, a size of BSR with a first type of BSR format plus its media access control (MAC) subheader, and a quantity of logical channel groups having data to-be-transmitted, wherein a quantity of logical channel groups corresponding to the BSR format is greater than or equal to 1;
wherein the one or more processors are specifically configured to execute the computer-executable instructions to:
  determine, according to a size of BSR with the second type of BSR format plus its MAC subheader corresponding to the logical channel groups having data to-be-transmitted, and the number of the padding bits, a BSR format for BSR-to-be-reported if the number of the padding bits is greater than the size of BSR with the first type of BSR format plus its MAC subheader, and is less than a size of a length of a second type of BSR format plus its MAC subheader, and the quantity of logical channel groups having data to-be-transmitted is no less than two;
wherein the second type of BSR comprises identifiers of all the logical channel groups having data to-be-transmitted and buffer status information corresponding to the logical channel groups; and buffer status information of each logical channel group is sequenced in an order of identifiers corresponding to each logical channel group; and
wherein the first type of BSR format is a short BSR format, and the second type of BSR format is a flexible long BSR format.

14. The terminal according to claim 13 wherein the quantity of logical channel groups corresponding to the BSR format is less than or equal to a quantity of logical channel groups having to-be-transmitted data being buffered.

15. The terminal according to claim 13, wherein the one or more processors are configured to execute the computer-executable instructions to determine to report a BSR of a third BSR format type, if the size of BSR with the second type of BSR format plus its MAC subheader corresponding to the logical channel groups having data to-be-transmitted is greater than the number of the padding bits, wherein a quantity of logical channel groups corresponding to the third type of BSR format is greater than 1, and less than a quantity of the logical channel groups having data to-be-transmitted, and the third type of BSR format is a flexible truncated BSR format.

16. The terminal according to claim 13, wherein the second type of BSR comprises a first bitmap, and bits in the first bitmap correspond to the logical channel groups having data to-be-transmitted; the second type of BSR further comprises buffer status information of each of the logical channel groups having data to-be-transmitted; and buffer status information of each logical channel group is sequenced in a corresponding arrangement order to the first bitmap.

17. The terminal according to claim 13, wherein the one or more processors are configured to execute the computer-executable instructions to determine, if the size of BSR with the second type of BSR format plus its MAC subheader corresponding to the logical channel groups having data to-be-transmitted is greater than the number of the padding bits, to report a BSR of a third BSR format type, wherein a quantity of logical channel groups corresponding to the third type of BSR format is greater than 1 and less than a quantity of the logical channel groups having data to-be-transmitted.

18. The terminal according to claim 17, wherein the one or more processors are configured to execute the computer-executable instructions to sequence, before the one or more processors determines to report a BSR of a third BSR format type, the logical channel groups having data to-be-transmitted in an order of priority; and select, according to a result of priority sequencing, one or more logical channel groups satisfying the padding bits from among logical channel groups having data to-be-transmitted.

19. The terminal according to claim 18, wherein the third type of BSR comprises a second bitmap, and bits in the second bitmap correspond to the some logical channel groups; the third type of BSR further comprises buffer status information of each of the some logical channel groups; and buffer status information of each logical channel group of the some logical channel groups is sequenced in a corresponding arrangement order of the some logical channel groups to the second bitmap.

20. The terminal according to claim 18, wherein the third type of BSR comprises an identifier of each of the some logical channel groups and buffer status information corresponding to the logical channel groups; and buffer status information of each logical channel group of the some logical channel groups is sequenced in an order of identifiers of the some logical channel groups.

21. The terminal according to claim 13, wherein the one or more processors are configured to execute the computer-executable instructions to determine, if the number of the padding bits is greater than the size of BSR with a first type of BSR format plus its MAC subheader, and is less than a size of a length of a second type of BSR format plus its MAC subheader, and the quantity of logical channel groups having data to-be-transmitted is one, to report the first type of BSR format.

22. The terminal according to claim 13, wherein the one or more processors are configured to execute the computer-executable instructions to determine, if the number of the padding bits is greater than a size of a length of BSR with a second type of BSR format plus its MAC subheader, to report the second type of BSR format, wherein a quantity of logical channel groups corresponding to the second type of BSR format is equal to a quantity of the logical channel groups having data to-be-transmitted.

23. The terminal according to claim 13, wherein the one or more processors are configured to execute the computer-executable instructions to determine, if the number of the padding bits is equal to the size of BSR with a first type of BSR format plus its MAC subheader, and the quantity of logical channel groups having data to-be-transmitted is at least two, to report a fourth type of BSR format, wherein the fourth type of BSR format corresponds to one of the at least two logical channel groups.

24. The terminal according to claim 13, wherein the one or more processors are configured to execute the computer-executable instructions to determine, if the number of the padding bits is equal to the size of BSR with a first type of BSR format plus its MAC subheader, and the quantity of logical channel groups having data to-be-transmitted is one, to report the first type of BSR format, wherein the first type of BSR format corresponds to the logical channel group.

* * * * *